United States Patent
Post et al.

(10) Patent No.: US 9,477,596 B2
(45) Date of Patent: Oct. 25, 2016

(54) LBA BITMAP USAGE

(71) Applicant: Apple Inc., Cupertino, CA (US)

(72) Inventors: Daniel J. Post, Pacifica, CA (US); Nir Jacob Wakrat, Los Altos, CA (US); Vadim Khmelnitsky, Foster City, CA (US)

(73) Assignee: APPLE INC., Cupertino, CA (US)

( * ) Notice: Subject to any disclaimer, the term of this patent is extended or adjusted under 35 U.S.C. 154(b) by 0 days.

(21) Appl. No.: 14/754,433

(22) Filed: Jun. 29, 2015

(65) Prior Publication Data

US 2015/0301938 A1    Oct. 22, 2015

Related U.S. Application Data

(62) Division of application No. 13/323,311, filed on Dec. 12, 2011, now Pat. No. 9,069,657.

(51) Int. Cl.
*G06F 12/02* (2006.01)

(52) U.S. Cl.
CPC ....... *G06F 12/0253* (2013.01); *G06F 12/0238* (2013.01); *G06F 12/0246* (2013.01); *G06F 2212/1044* (2013.01); *G06F 2212/7201* (2013.01); *G06F 2212/7205* (2013.01); *G06F 2212/7209* (2013.01)

(58) Field of Classification Search
CPC .................. G06F 12/0246; G06F 2212/7209; G06F 2212/7201; G06F 2212/7202; G06F 17/30324; G11B 2020/10907
See application file for complete search history.

(56) References Cited

U.S. PATENT DOCUMENTS

| | | | |
|---|---|---|---|
| 6,915,405 | B2 | 7/2005 | Noyes |
| 6,938,145 | B2 | 8/2005 | Noyes et al. |
| 7,437,530 | B1 | 10/2008 | Rajan |
| 7,949,851 | B2 | 5/2011 | Allen et al. |
| 2007/0016754 | A1 | 1/2007 | Testardi |
| 2007/0266037 | A1 | 11/2007 | Terry et al. |

(Continued)

FOREIGN PATENT DOCUMENTS

| | | |
|---|---|---|
| EP | 2282266 | 2/2011 |
| JP | 2003-067244 | 3/2003 |

(Continued)

OTHER PUBLICATIONS

Wu et al. "A File-System-Aware FTL Design for Flash-Memory Storage Systems." Design, Automation & Test in Europe Conference & Exhibition, 6 pages, Apr. 20-24, 2009.

*Primary Examiner* — Gary Portka
(74) *Attorney, Agent, or Firm* — Van Court & Aldridge LLP

(57) ABSTRACT

Systems and methods are disclosed for logical block address ("LBA) bitmap usage for a system having non-volatile memory ("NVM"). A bitmap can be stored in volatile memory of the system, where the bitmap can store the mapping statuses of one or more logical addresses. By using the bitmap, the system can determine the mapping status of a LBA without having to access the NVM. In addition, the system can update the mapping status of a LBA with minimal NVM accesses. By reducing the number of NVM accesses, the system can avoid triggering a garbage collection process, which can improve overall system performance.

10 Claims, 9 Drawing Sheets

(56) References Cited

U.S. PATENT DOCUMENTS

| | | |
|---|---|---|
| 2009/0168525 A1 | 7/2009 | Olbrich et al. |
| 2009/0313418 A1 | 12/2009 | Ross |
| 2010/0100667 A1 | 4/2010 | Kang et al. |
| 2010/0293324 A1 | 11/2010 | Estakhri et al. |
| 2011/0022819 A1 | 1/2011 | Post et al. |
| 2011/0231594 A1 | 9/2011 | Sugimoto et al. |
| 2013/0031293 A1 | 1/2013 | Van Riel |

FOREIGN PATENT DOCUMENTS

| | | |
|---|---|---|
| JP | 2007-179479 | 7/2007 |
| JP | 2009-237668 | 10/2009 |
| JP | 2011-508349 | 3/2011 |
| JP | 2011-192260 | 9/2011 |
| TW | 200601040 | 1/2006 |
| TW | I287191 | 9/2007 |
| WO | 2007/066720 | 6/2007 |
| WO | 2010/111694 | 9/2010 |
| WO | 2011/024239 | 3/2011 |

| 400A | 400B | 400C | 400D | 400E | 400F | 400G | 400H |
|---|---|---|---|---|---|---|---|
| MAPPED | MAPPED | UNMAPPED | MAPPED | MAPPED | UNMAPPED | UNMAPPED | UNMAPPED |

LBA# 0 1 2 3 4 5 6 7

FIG. 4A

| 402A | 402B | 402C | 402D | 402E | 402F | 402G | 402H |
|---|---|---|---|---|---|---|---|
| YES | MIX | MIX | MIX | YES | YES | YES | YES |

LBA# 0-7 8-15 16-23 24-31 32-39 40-47 48-55 56-63

FIG. 4B

| 404A | 404B | 404C | 404D | 404E | 404F | 404G | 404H |
|---|---|---|---|---|---|---|---|
| MAPPED | MAPPED | MIX | MIX | MIX | UNMAPPED | MIX | MIX |

LBA# 0-7 8-15 16-23 24-31 32-39 40-47 48-55 56-63

LBA BITMAP USAGE

This application is a divisional of U.S. patent application Ser. No. 13/323,311 filed Dec. 30, 2011, which is hereby incorporated herein by reference.

BACKGROUND OF THE DISCLOSURE

NAND flash memory, as well as other types of non-volatile memories ("NVMs"), are commonly used for mass storage. For example, consumer electronics such as portable media players often include flash memory to store music, videos, and other media.

A system having an NVM may include index pages stored in the NVM that indicate the mapping statuses of logical block addresses ("LBAs"). For example, if the mapping status of a LBA is "mapped", this can indicate that the LBA is currently associated with data stored in the NVM. Alternatively, if the mapping status of a LBA is "unmapped", this can indicate that data previously mapped to the LBA has been erased or the LBA has never been mapped to any data.

Because mapping statuses of LBAs are stored in the index pages, the system needs to update an index page each time a LBA is mapped or unmapped, thereby causing programming operations to be performed on the NVM. Because of the additional programming operations, the system eventually needs to perform garbage collection on the NVM in order to free up space. This in turn reduces system performance.

SUMMARY OF THE DISCLOSURE

Systems and methods are disclosed for logical block address ("LBA") bitmap usage for a system having non-volatile memory ("NVM"). A bitmap, which can be stored in a volatile memory of the system, can store the mapping statuses of one or more logical addresses (e.g., LBAs). Using the bitmap, the system can determine the mapping status of a LBA without having to access the NVM. In addition, the system can update the mapping status of a LBA with minimal NVM accesses. By reducing the number of NVM accesses, the system can avoid triggering a garbage collection process, which can improve overall system performance.

BRIEF DESCRIPTION OF THE DRAWINGS

The above and other aspects and advantages of the invention will become more apparent upon consideration of the following detailed description, taken in conjunction with accompanying drawings, in which like reference characters refer to like parts throughout, and in which:

FIGS. 4A-4C are illustrative bitmaps in accordance with various embodiments of the invention;

DETAILED DESCRIPTION OF THE DISCLOSURE

Systems and methods for logical block address ("LBA") bitmap usage for a system having non-volatile memory ("NVM") are provided. A bitmap, which can be stored in a volatile memory of the system, can store the mapping statuses of one or more logical addresses (e.g., LBAs). Each entry of the bitmap can correspond to one or more LBAs.

Using the bitmap, an NVM interface of the system can determine the mapping status of a LBA without having to access the NVM. In addition, the NVM interface can update the mapping status of a LBA with minimal NVM accesses. For example, in response to receiving a request from a file system to unmap a particular LBA, the NVM interface can change the mapping status of a corresponding entry of the bitmap from "Mapped" to "Unmapped". By reducing the number of NVM accesses, the system can avoid triggering a garbage collection process, which can improve overall system performance.

After changing the mapping status of a LBA by updating the bitmap, the NVM interface can consult a tree stored in volatile memory in order to update at least one validity counter, which is also stored in volatile memory. However, the tree, which can include a mapping between LBAs and physical addresses of the NVM, does not necessarily need to be updated to reflect the unmapping of the LBA. Instead, the NVM interface can determine to perform a tree update only if tree memory usage is advantageously decreased.

In situations where the NVM interface is unable to update the at least one validity counter by consulting a tree, the NVM interface may need to load an index page associated with the LBA from the NVM. Although the NVM interface needs to read the index page into volatile memory, the NVM interface does not have to update and re-program the index page into the NVM. The net result is that the total number of index page operations that needs to be performed is reduced, and garbage collection can be avoided.

In some embodiments, the bitmap can improve the garbage collection process. In particular, using the bitmap, the NVM interface can reduce the number of index page accesses that need to be made while performing garbage collection on user data stored in the NVM.

Figure 1:
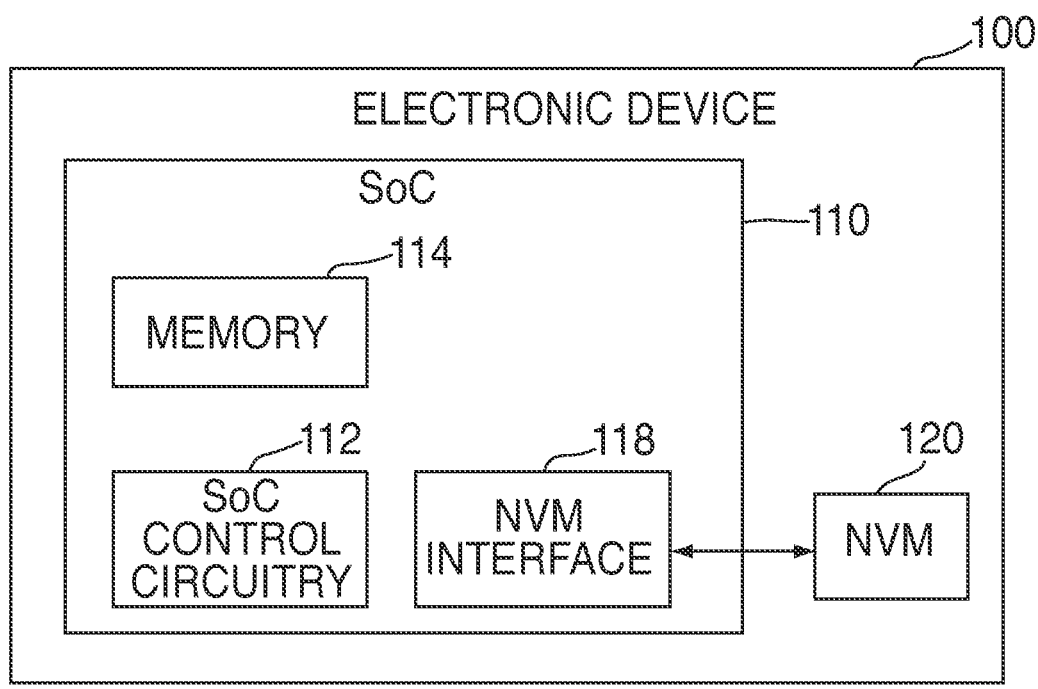
FIG. 1 is a block diagram of an electronic device configured in accordance with various embodiments of the invention.

FIG. 1 illustrates a block diagram of electronic device 100. In some embodiments, electronic device 100 can be or can include a portable media player, a cellular telephone, a pocket-sized personal computer, a personal digital assistance ("PDA"), a desktop computer, a laptop computer, and any other suitable type of electronic device.

Electronic device 100 can include system-on-a-chip ("SoC") 110 and non-volatile memory ("NVM") 120. Non-volatile memory 120 can include a NAND flash memory based on floating gate or charge trapping technology, NOR flash memory, erasable programmable read only memory ("EPROM"), electrically erasable programmable read only memory ("EEPROM"), Ferroelectric RAM ("FRAM"), magnetoresistive RAM ("MRAM"), or any combination thereof.

NVM 120 can be organized into "blocks", which can be the smallest erasable unit, and further organized into "pages", which can be the smallest unit that can be programmed or read. In some embodiments, NVM 120 can include multiple integrated circuits, where each integrated circuit may have multiple blocks. Memory locations (e.g., blocks or pages of blocks) from corresponding integrated circuits may form "super blocks". Each memory location (e.g., page or block) of NVM 120 can be referenced using a physical address (e.g., a physical page address or physical block address).

Figure 2:
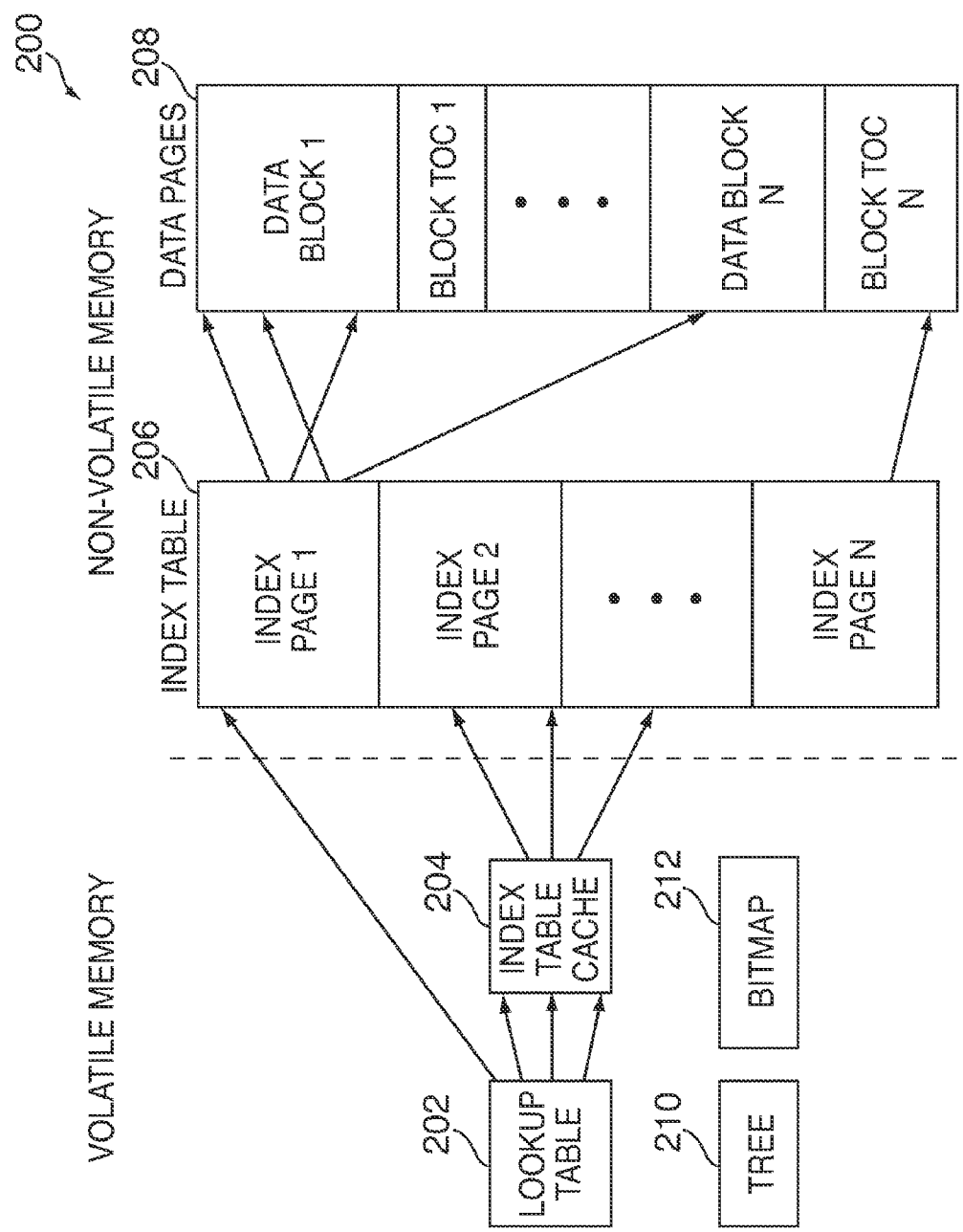
FIG. 2 is an illustrative block diagram of a memory mapping architecture in accordance with various embodiments of the invention.

Referring now to FIG. 2, an illustrative memory mapping architecture 200 for mapping logical addresses to physical pages is shown. Architecture 200 is divided into volatile memory (shown left of the dashed line) and non-volatile memory (shown right of the dashed line). That is, lookup table 202, index table cache 204, tree 210, and bitmap 212 are stored in volatile memory (e.g., memory 114 of FIG. 1), whereas index table 206 and data pages 208 are stored in non-volatile memory (e.g., NVM 120 of FIG. 1).

One or more pages of the NVM can be data pages 208, which can be used to store data associated with the general operations of components of a SoC (e.g., SoC 110 of FIG. 1) or a device (e.g., device 100 of FIG. 1). In some embodiments, a block table-of-contents ("TOC") can be associated with each data block. For instance, in the example shown in FIG. 2, block TOC 1 may be associated with data block 1, block TOC N may be associated with data block N, and so forth. Each block TOC can be stored in the corresponding data block, and can include information that maps data pages of the data block to corresponding logical addresses.

In addition, one or more pages of the NVM can be used to store an index table 206. In embodiments where logical sectors are mapped directly to physical pages, logical-to-physical mappings can be stored in index table 206. As used herein, a "logical-to-physical mapping" can be a mapping between one or more logical addresses (e.g., logical sectors) and physical addresses (e.g., physical page addresses or virtual block addresses) of data pages. For example, index table 206 can hold the physical addresses of data pages 208 of the NVM.

In some cases, index table 206 can include multiple index pages 1-N, where each index page can map logical addresses to one or more physical addresses of data pages 208 (e.g., store one or more logical-to-physical mappings). For example, as shown in FIG. 2, index page 1 of index table 206 can map logical addresses to one or more data pages of data block 1 and data block N.

Referring back to FIG. 1, system-on-a-chip 110 can include SoC control circuitry 112, memory 114, and NVM interface 118. SoC control circuitry 112 can control the general operations and functions of SoC 110 and the other components of SoC 110 or device 100. For example, responsive to user inputs and/or the instructions of an application or operating system, SoC control circuitry 112 can issue read or write requests to NVM interface 118 to obtain data from or store data in NVM 120. For clarity, data that SoC control circuitry 112 may request for storage or retrieval may be referred to as "user data", even though the data may not be directly associated with a user or user application. Rather, the user data can be any suitable sequence of digital information generated or obtained by SoC control circuitry 112 (e.g., via an application or operating system).

SoC control circuitry 112 can include any combination of hardware, software, and firmware, and any components, circuitry, or logic operative to drive the functionality of electronic device 100. For example, SoC control circuitry 112 can include one or more processors that operate under the control of software/firmware stored in NVM 120 or memory 114.

Memory 114 can include any suitable type of volatile memory, such as random access memory ("RAM") (e.g., static RAM ("SRAM"), dynamic random access memory ("DRAM"), synchronous dynamic random access memory ("SDRAM"), double-data-rate ("DDR") RAM), cache memory, read-only memory ("ROM"), or any combination thereof. Memory 114 can include a data source that can temporarily store user data for programming into or reading from non-volatile memory 120. In some embodiments, memory 114 may act as the main memory for any processors implemented as part of SoC control circuitry 112.

In some embodiments, memory 114 can store one or more data structures that can be used by NVM interface 118 to perform its associated operations. For example, memory 114 can include a bitmap. This is also shown in FIG. 2, where the volatile memory includes bitmap 212.

The bitmap can store the mapping statuses (e.g., "Mapped" or "Unmapped") of one or more logical addresses (e.g., LBAs). For instance, if the mapping status of a LBA is "Mapped", NVM interface 118 can determine that the LBA is currently associated with user data stored in NVM 120. Alternatively, if the mapping status of a LBA is "Unmapped", NVM interface 118 can determine that the LBA was previously mapped to user data (but the user data has since been deleted), or the LBA has never been mapped to any user data.

The bitmap can be populated at any suitable time. For example, in some systems, a file system can provide information regarding which LBAs are unmapped during system boot-up. For example, once the file system mounts, NVM interface 118 can receive information associated with mapping statuses of LBAs from the file system. After receiving the information, NVM interface 118 can use the information to populate the bitmap. Because the mapping statuses can be automatically obtained from the file system, the overall system mount-time can be reduced. If, however, the file system does not provide information regarding which LBAs are unmapped during boot-up, NVM interface 118 can obtain the mapping statuses by scanning NVM 120. During system operation, the bitmap can be dynamically maintained and used by NVM interface 118.

The bitmap can have any suitable size such as, for example, 2 MB. The amount of memory that is allocated to the bitmap can depend on one or more factors. For example, a smaller bitmap can allow more space to be made available in memory 114 for storing other information (e.g., a tree). In contrast, a larger bitmap can allow each entry of the bitmap to correspond to a single LBA, which can provide NVM interface 118 with definitive information regarding the mapping status of each LBA. In either case, the bitmap can have a smaller size as compared to a different data structure (e.g., a table) that needs to store physical and/or logical addresses in addition to mapping statuses. The various types of bitmaps will be described in greater detail in connection with FIGS. 4A-4C.

As another example, memory 114 can include a tree, which can include multiple tree entries. For example, as shown in FIG. 2, tree 210 can provide a mapping between logical addresses (e.g., LBAs) and corresponding physical addresses of a NVM (e.g., NVM 120 of FIG. 1). Tree 210 can have a tree structure that improves the retrieval time for a particular entry of the tree such as, for example, a b-tree or a b*-tree. In some cases, tree 210 may be allocated a pre-determined amount of tree memory in the volatile memory.

As yet another example, memory 114 can include a lookup table and/or an index table cache. For example, as shown in FIG. 2, lookup table 202 can hold the location (e.g., physical addresses) of index table 206. In particular, lookup table 202 can hold the logical-to-physical mappings of index pages 1-N that form part of index table 206. In addition, lookup table 202 can also store the memory location(s) of index table cache 204.

Index table cache 204 can hold the physical addresses of recently written or accessed logical addresses (e.g., logical sectors) in order to provide faster readout. That is, cache 204 can hold logical-to-physical mappings for data pages 208 that are currently being programmed or have recently been programmed. On a periodic basis, information stored in index table cache 204 can be flushed out to index pages 1-N of the NVM.

Referring back to FIG. 1, NVM interface 118 may include any suitable combination of hardware, software, and/or firmware configured to act as an interface or driver between SoC control circuitry 112 and NVM 120. For any software modules included in NVM interface 118, corresponding program code may be stored in NVM 120 or memory 114.

NVM interface 118 can perform a variety of functions that allow SoC control circuitry 112 to access NVM 120 and to manage the memory locations (e.g., pages, blocks, super blocks, integrated circuits) of NVM 120 and the data stored therein (e.g., user data). For example, NVM interface 118 can interpret the read or write requests from SoC control circuitry 112, perform wear leveling, and generate read and program instructions compatible with the bus protocol of NVM 120.

While NVM interface 118 and SoC control circuitry 112 are shown as separate modules, this is intended only to simplify the description of the embodiments of the invention. It should be understood that these modules may share hardware components, software components, or both. For example, SoC control circuitry 112 may execute a software-based memory driver for NVM interface 118.

In some embodiments, electronic device 100 can include a target device, such as a flash memory drive or SD card, that includes NVM 120 and some or all portions of NVM interface 118. In these embodiments, SoC 110 or SoC control circuitry 112 may act as the host controller for the target device. For example, as the host controller, SoC 110 can issue read and write requests to the target device.

Figure 3:
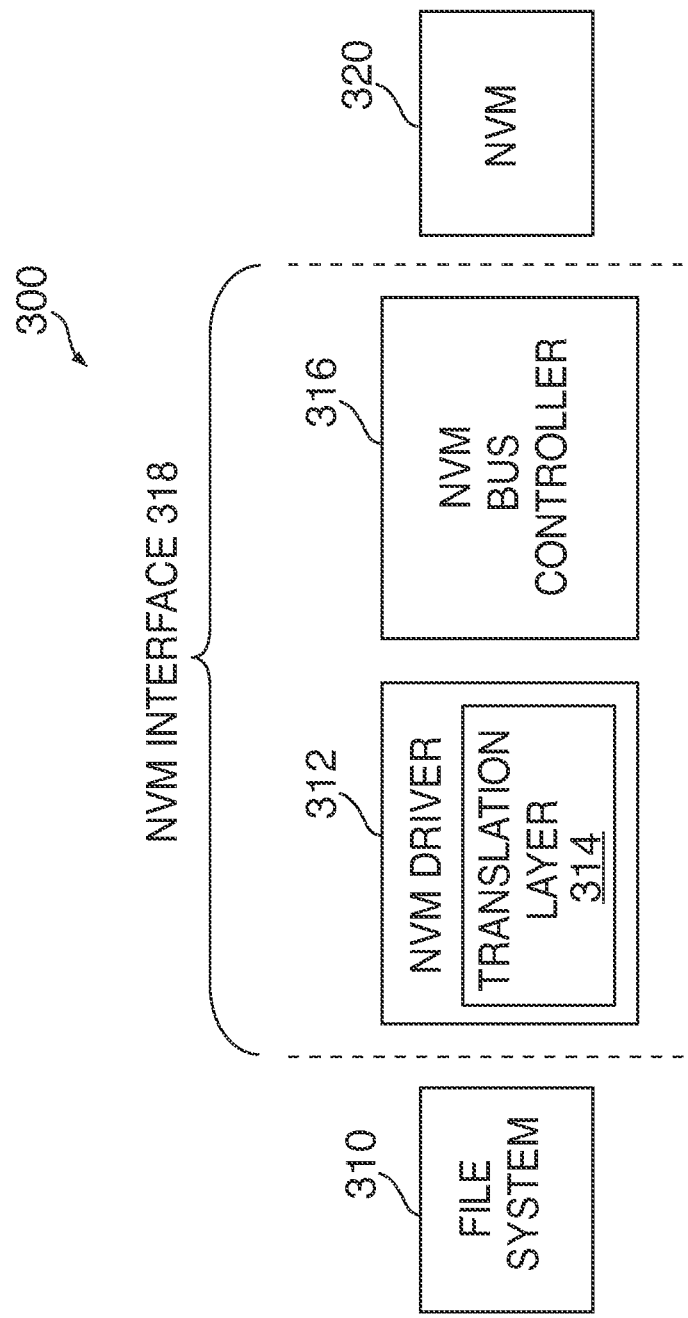
FIG. 3 is another block diagram of an electronic device configured in accordance with various embodiments of the invention.

FIG. 3 illustrates a block diagram of electronic device 300, which may illustrate in greater detail some of the firmware, software, and/or hardware components of electronic device 100 (FIG. 1) in accordance with various embodiments. Electronic device 300 may have any of the features and functionalities described above in connection with FIG. 1, and vice versa. As shown, dashed lines demarcate the layers. It is understood that the depiction of which components fall within the demarcation lines are merely illustrative and that one or more components can be affiliated with a different layer.

Electronic device 300 can include file system 310, NVM driver 312, NVM bus controller 316, and NVM 320. In some embodiments, file system 310 and NVM driver 312 may be software or firmware modules, and NVM bus controller 316 and NVM 320 may be hardware modules. Accordingly, in these embodiments, NVM driver 312 may represent the software or firmware aspect of NVM interface 318, and NVM bus controller 316 may represent the hardware aspect of NVM interface 318.

File system 310 can include any suitable type of file system, such as a File Allocation Table ("FAT") file system or a Hierarchical File System Plus ("HFS+"), and may be part of the operating system of electronic device 300 (e.g., part of SoC control circuitry 112 of FIG. 1). In some embodiments, file system 310 may include a flash file system, which provides a logical-to-physical mapping of pages. In these embodiments, file system 310 may perform some or all of the functionalities of NVM driver 312 discussed below, and therefore file system 310 and NVM driver 312 may or may not be separate modules.

File system 310 may manage file and folder structures for the application and operating system. File system 310 may operate under the control of an application or operating system running on electronic device 300, and may provide write and read requests to NVM driver 312 when the application or operating system requests that information be read from or stored in NVM 320. Along with each read or write request, file system 310 can provide a logical address to indicate where the user data should be read from or written to, such as a logical page address or a logical block address with a page offset.

File system 310 may provide read and write requests to NVM driver 312 that are not directly compatible with NVM 320. For example, the logical addresses may use conventions or protocols typical of hard-drive-based systems. A hard-drive-based system, unlike flash memory, can overwrite a memory location without first performing a block erase. Moreover, hard drives may not need wear leveling to increase the lifespan of the device. Therefore, NVM interface 318 can perform any functions that are memory-specific, vendor-specific, or both to handle file system requests and perform other management functions in a manner suitable for NVM 320.

NVM driver 312 can include translation layer 314. In some embodiments, translation layer 314 may be or include a flash translation layer ("FTL"). On a write request, translation layer 314 can map the provided logical address to a free, erased physical location on NVM 320. On a read request, translation layer 314 can use the provided logical address to determine the physical address at which the requested data is stored. Because each NVM may have a different layout depending on the size or vendor of the NVM, this mapping operation may be memory and/or vendor-specific.

In addition to logical-to-physical address mapping, translation layer 314 can perform any other suitable functions that may be typical of flash translation layers, such as garbage collection ("GC") and wear leveling.

In some embodiments, NVM driver 312 may interface with NVM bus controller 316 to complete NVM access requests (e.g., program, read, and erase requests). Bus controller 316 may act as the hardware interface to NVM 320, and can communicate with NVM 320 using the bus protocol, data rate, and other specifications of NVM 320.

NVM interface 318 may manage NVM 320 based on memory management data, sometimes referred to herein as "metadata". The metadata may be generated by NVM driver 312 or may be generated by a module operating under the control of NVM driver 312. For example, metadata can include any information used for managing the mapping between logical and physical addresses, bad block management, wear leveling, ECC data used for detecting or correcting data errors, or any combination thereof. The metadata may include data provided by file system 310 along with the user data, such as a logical address. Thus, in general, "metadata" may refer to any information about or relating to user data or used generally to manage the operation and memory locations of a non-volatile memory.

NVM interface 318 may be configured to store metadata in NVM 320. In some embodiments, NVM interface 318 may store metadata associated with user data at the same memory location (e.g., page) in which the user data is stored. For example, NVM interface 318 may store user data, the associated logical address, and ECC data for the user data at one or more memory locations of NVM 320. NVM interface 318 may also store other types of metadata about the user data in the same memory location.

NVM interface 318 may store the logical address so that, on power-up of NVM 320 or during operation of NVM 320, electronic device 300 can determine what data resides at that location. In particular, because file system 310 may reference the user data according to its logical address and not its physical address, NVM interface 318 may store the user data and logical address together to maintain their association. This way, even if a separate table maintaining the physical-to-logical mapping in NVM 320 becomes outdated, NVM interface 318 may still determine the proper mapping at power-up or reboot of electronic device 300, for example.

As discussed above, a bitmap, which can be stored in volatile memory, can store the mapping statuses of one or more LBAs. In addition, each entry of the bitmap can correspond to one or more LBAs. For example, referring now to FIGS. 4A-4C, various illustrative bitmaps are shown. Persons skilled in the art will appreciate that a bitmap can include any suitable number of entries. However, for the sake of simplicity, each bitmap of FIGS. 4A-4C is shown to include only eight entries.

Turning first to FIG. 4A, bitmap 400 can include entries 400A-H. Each entry of bitmap 400 can correspond to a single LBA. Thus, for example, entries 400A-H can each correspond to LBAs 0-7, respectively. In addition, each entry can correspond to one bit. That is, each entry of bitmap 400 can store a binary value (e.g., 0 or 1), where each binary value can correspond to a mapping status of "Unmapped" or "Mapped". When data is programmed to a LBA and the corresponding bitmap entry has a mapping status of "Unmapped", the bitmap entry can be updated to reflect a mapping status of "Mapped". If, however, the corresponding bitmap entry already has a mapping status of "Mapped", the validity counter of the block where the LBA was previously stored can be decreased.

Because each entry of bitmap 400 corresponds to a single LBA, bitmap 400 can provide an NVM interface (e.g., NMV interface 118 of FIG. 1 or NVM interface 318 of FIG. 3) with definitive information regarding whether a particular LBA is mapped or unmapped. In alternative configurations, the granularity of entry-to-LBA can be decreased such that each entry of a bitmap can correspond to multiple LBAs (e.g., 8, 16, or 32 LBAs). Although such configurations may not provide a definitive mapping status for each LBA of the system, these bitmaps can be smaller (e.g., 256 kB as opposed to 2 MB), which save additional space in memory (e.g., memory 114 of FIG. 1). The additional memory space can be used for other purposes such as, for example, storing a larger tree (e.g., tree 210 of FIG. 2).

In other embodiments, each entry of a bitmap can correspond to multiple LBAs. For example, turning now to FIG. 4B, bitmap 402 can include entries 402A-H, where each entry can be associated with eight LBAs. In addition, each entry can still correspond to one bit. That is, each entry can store a binary value, where each binary value can correspond to a mapping status of "All mapped/All unmapped" or "Unknown". For instance, as shown in FIG. 4B, if an entry has a "Yes" label, all LBAs corresponding to the entry can be considered either all mapped or all unmapped, depending on the manner in which bitmap 402 is configured. In contrast, if an entry has a "Mix" label, the mapping statuses of the LBAs corresponding to the entry can be considered "Unknown". Thus, one or more LBAs corresponding to the entry can be unmapped, while the remaining LBAs can be mapped.

Turning next to FIG. 4C, bitmap 404 can include entries 404A-H, where each entry can also correspond to eight LBAs. In this case, however, each entry can store multiple bits (e.g., two bits). Consequently, each entry of bitmap 404 can correspond to one of three values, where each value can correspond to a suitable mapping status (e.g., "Mapped", "Unmapped", or "Mix"). For instance, as shown in FIG. 4C, if an entry has a "Mapped" label, all LBAs corresponding to the entry can be mapped. Likewise, if an entry has an "Unmapped" label, all LBAs corresponding to the entry can be unmapped. In contrast, if an entry has a "Mix" label, one or more LBAs corresponding to the entry can be unmapped, while the remaining LBAs can be mapped.

For bitmaps 402 and 404, if an NVM interface determines that the mapping status of an entry is an unknown status (e.g., the NVM interface encounters an "Unknown" or "Mix" value for an entry), the NVM interface may need to separately determine and/or update the mapping status of each LBA associated with the entry. For instance, the NVM interface can consult and update one or more data structures of the system such as, for example, a tree (e.g., tree 210 of FIG. 2) and/or one or more index pages (e.g., index pages 1-N of FIG. 2). As a result, the bitmap may become less useful for determining mapping statuses of LBAs as the number of "Unknown" or "Mix" values increase in the bitmap.

In addition, if a LBA associated with a "Mapped" entry is now unmapped, the entry will need to be updated to have a mapping status of "Unknown" or "Mix". As a result, in order to continue monitoring the mapping statuses of LBAs, the NVM interface may need to update a tree and/or one or more index pages in order to reflect the changed mapping status of the LBA.

The granularity of the bitmap can thus be determined based on one or more factors such as, for example, the current memory availability, the duty cycle that would be required to definitively determine the mapping status of each LBA for a given granularity, the system usage model, and/or any combination thereof. The system usage model may include the size of files that are being written and/or deleted. For instance, if the system is sequentially writing and deleting large files, a grosser granularity of entry-to-LBA can be selected for the bitmap. In contrast, if the system is writing and deleting small files, a finer granularity of entry-to-LBA may be selected for the bitmap in order to provide sufficient information for each LBA.

In some embodiments, the NVM interface can dynamically adjust the granularity of the bitmap while a system is operating (e.g., increase or decrease the range of each bitmap entry based on the frequency of unknown statuses at a given level). For example, the NVM interface can first initialize the bitmap such that each entry corresponds to one LBA. Then, as the system continues to operate, the NVM interface can increase the number of LBAs corresponding to each entry if, for example, the number of entries that have unknown statuses is less than a pre-determined threshold (e.g., less than 50% of the bitmap entries have unknown statuses). In other embodiments, the NVM interface can initialize the bitmap such that each entry of the bitmap corresponds to a static pre-determined number of LBAs (e.g., each entry corresponds to one LBA, or each entry corresponds to 32 LBAs).

The system can use the bitmap to monitor the mapping statuses of LBAs in a variety of scenarios. Conventionally, in order for a system to determine the mapping status of a LBA, the system may need to consult an NVM (e.g., NVM 120 of FIG. 1 or NVM 320 of FIG. 3), particularly if the system does not maintain a tree or if the mapping statuses of LBAs are only partially captured by a tree. For example, in order to unmap one or more LBAs, the system may need to first read one or more index pages (e.g., index pages 1-N of FIG. 2) stored in the NVM into an index table cache (e.g., index table cache 204 of FIG. 2) stored in memory (e.g., memory 114 of FIG. 1). Then, the index pages can be updated in the index table cache to reflect the unmapping of the one or more LBAs (e.g., by replacing associated physical addresses with default values). At a later time, the updated index pages can be programmed back to the NVM. These additional programming operations, however, may prematurely trigger garbage collection of the NVM, which can negatively impact system performance.

In other systems where mapping statuses of LBAs are entirely captured by a tree, the system may need to update the tree in order to unmap LBAs. Subsequently, one or more portions (e.g., entries) of the tree may need to be flattened once the tree memory usage is determined to exceed a pre-determined threshold. However, flattening operations may also involve additional operations on the NVM because data corresponding to flattened entries may need to be re-programmed in the NVM. These operations may later trigger garbage collection.

As another example, in order to read a LBA in a conventional system, an index page stored in the NVM may need to be consulted (e.g., particularly if the index page is not stored in an index table cache, such as index table cache 204 of FIG. 2). Thus, the system may need to read an entire index page into memory (e.g., memory 114 of FIG. 1) before being able to determine whether a LBA is mapped or unmapped.

Accordingly, by relying on a bitmap (e.g., bitmap 400, 402, or 404 of FIGS. 4A-4C, respectively) that is stored in memory (e.g., memory 114 of FIG. 1), an NVM interface (e.g., NVM interface 118 of FIG. 1 or NVM interface 318 of FIG. 3) can determine the mapping status of a LBA without having to access the NVM. In addition, the NVM interface can update a LBA's mapping status with minimal NVM accesses. By reducing the number of NVM accesses, the system can avoid triggering a garbage collection process, which can improve overall system performance. For example, turning now to FIGS. 5 and 6, flowcharts of illustrative processes are shown in accordance with various embodiments of the invention.

Figure 5:
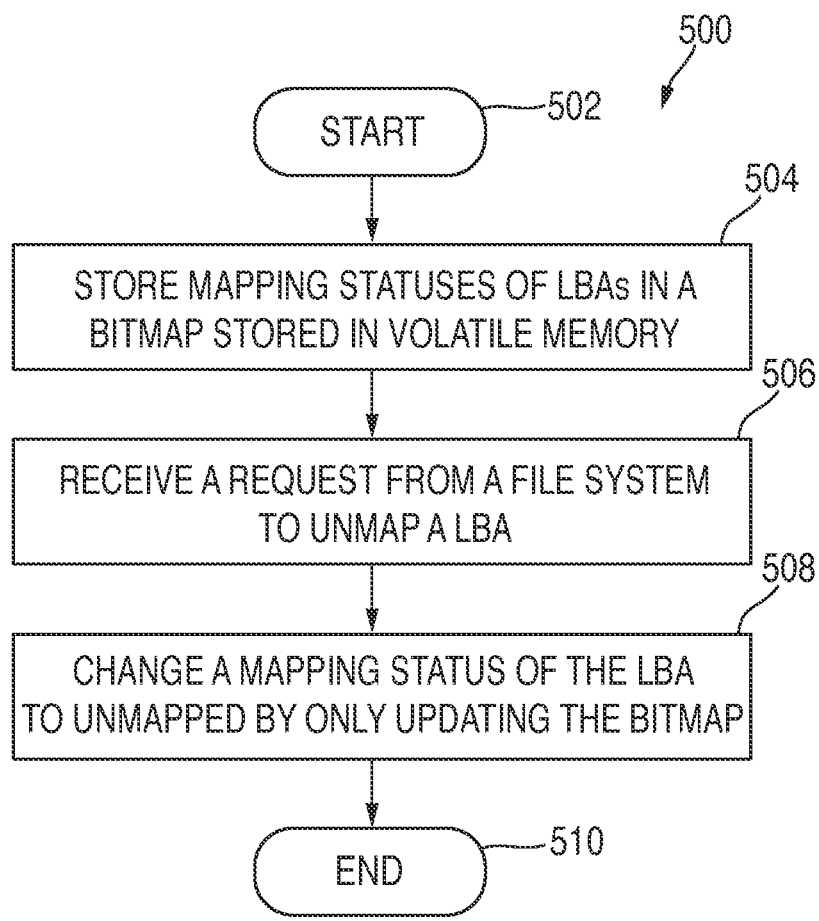
FIG. 5 is a flowchart of an illustrative process for handling an unmap request using a bitmap in accordance with various embodiments of the invention.

Turning first to FIG. 5, process 500 is shown for handling an unmap request using a bitmap. Process 500 may begin at step 502, and at step 504, an NVM interface can store mapping statuses of multiple LBAs in a bitmap (e.g., bitmap 400, 402, or 404 of FIGS. 4A-4C, respectively) stored in volatile memory (e.g., memory 114 of FIG. 1). For example, as discussed previously, the NVM interface can obtain the mapping statuses from a file system (e.g., file system 310 of FIG. 3) during system boot-up or through scanning an NVM (e.g., NVM 120 of FIG. 1 or NVM 320 of FIG. 3).

At step 506, the NVM interface can receive a request from a file system to unmap a LBA. Continuing to step 508, the NVM interface can change a mapping status of the LBA to unmapped by only updating the bitmap. For example, referring back to FIG. 4A, if the NVM interface receives a request to unmap LBA 0, the NVM interface can change the mapping status of entry 400A from "Mapped" to "Unmapped". After changing the mapping status of the LBA by updating the bitmap, the NVM interface can update at least one validity counter stored in memory (e.g., memory 114 of FIG. 1). The at least one validity counter can correspond to a super block associated with the LBA. After changing the mapping status, process 500 may end at step 510.

Figure 6:
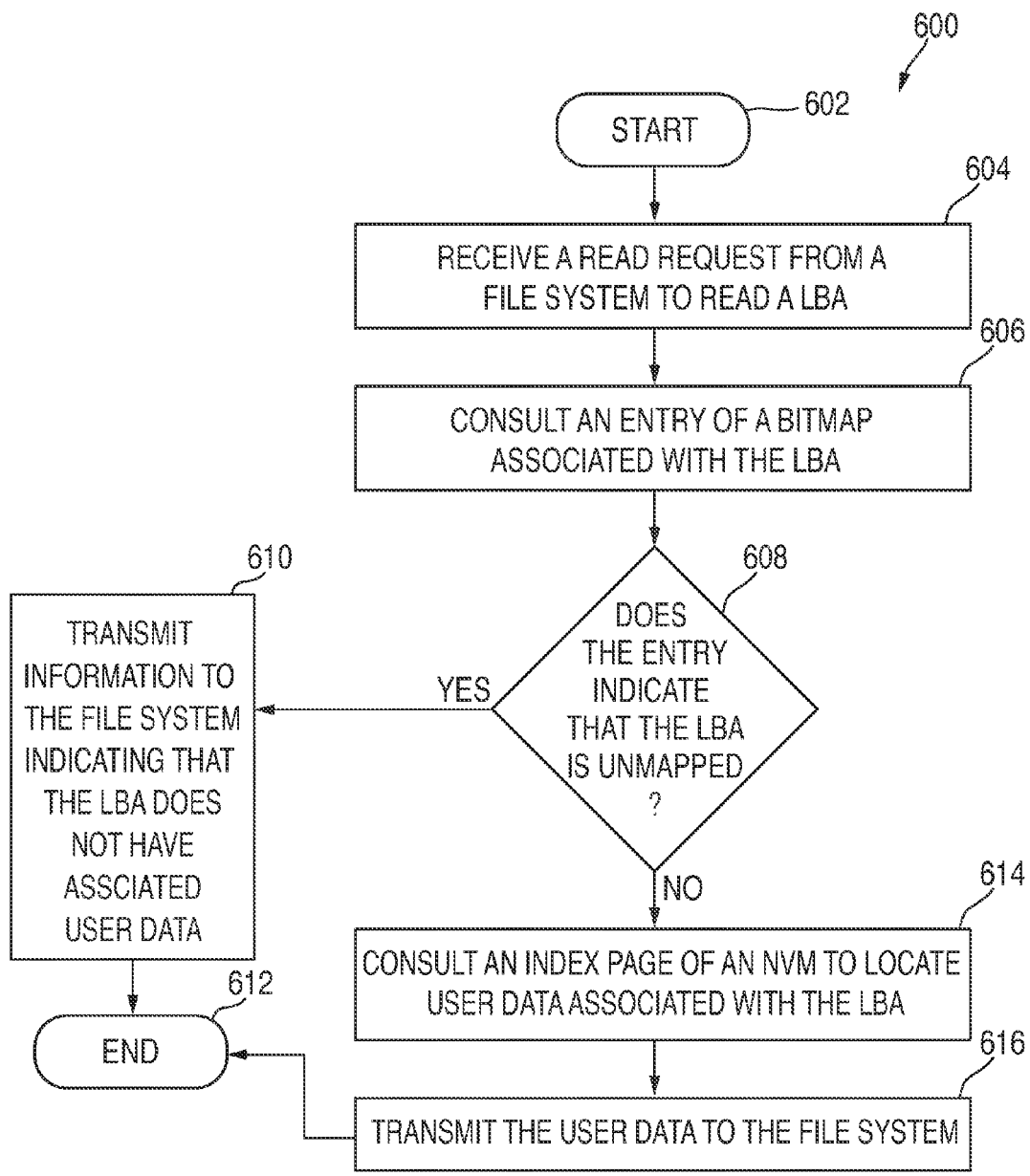
FIG. 6 is a flowchart of an illustrative process for handling a read request using a bitmap in accordance with various embodiments of the invention.

Turning now to FIG. 6, process 600 is shown for handling a read request using a bitmap. Process 600 may begin at step 602, and at step 604, an NVM interface (e.g., NVM interface 118 of FIG. 1 or NVM interface 318 of FIG. 3) can receive a read request from a file system (e.g., file system 310 of FIG. 3) to read a LBA.

Then, at step 606, the NVM interface can consult an entry of a bitmap (e.g., bitmap 400, 402, or 404 of FIGS. 4A-4C, respectively) associated with the LBA. Continuing to step 608, the NVM interface can determine whether the entry indicates the LBA is unmapped.

If, at step 608, the NVM interface determines that the entry indicates that the LBA is unmapped, process 600 may move to step 610. For example, referring back to FIG. 4A, if the NVM interface receives a request to read LBA 2, the NVM interface can determine that LBA 2 is unmapped by consulting entry 400C of bitmap 400.

At step 610, the NVM interface can transmit information to the file system indicating that the LBA does not have associated user data. Thus, the NVM interface can directly determine the mapping status of a LBA without having to consult index pages stored in an NVM. Process 600 may then end at step 612.

Referring back to step 608, if the NVM interface instead determines that the entry indicates that the LBA is not unmapped, process 600 may move to step 614. At step 614, the NVM interface can consult an index page of an NVM (e.g., NVM 120 of FIG. 1 or NVM 320 of FIG. 3) to locate user data associated with the LBA. Thus, in contrast to conventional systems, the NVM interface only needs to consult an index page if the bitmap entry indicates the LBA is mapped.

After locating the user data, the NVM interface can transmit the user data to the file system at step 616. Process 600 may then end at step 612.

In some embodiments, after changing the mapping status of a LBA by updating a bitmap, an NVM interface can consult a tree in order to update validity counters stored in memory (e.g., memory 114 of FIG. 1). Validity counters can be maintained for each super block of the NVM. In some embodiments, validity counters can be stored as a table in the memory.

Although the NVM interface may consult the tree in updating validity counters, the tree does not necessarily need to be updated to reflect the LBA unmapping. This is because the bitmap already stores the mapping statuses of LBAs used by a file system. Instead, the NVM interface can perform a tree update only if tree memory usage is advantageously decreased. Otherwise, the NVM interface can leave the tree in its current state.

Figure 7:
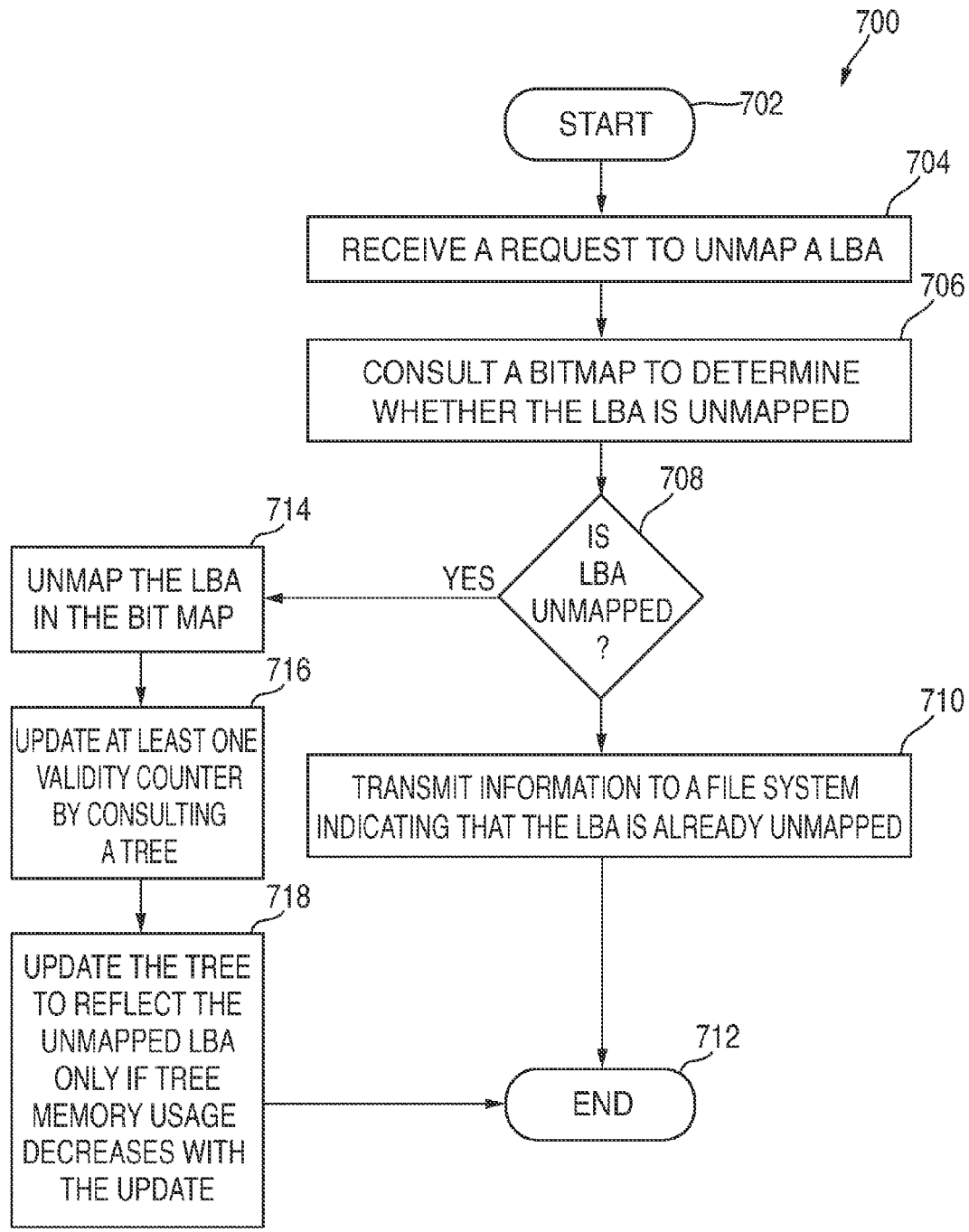
FIG. 7 is a flowchart of an illustrative process for updating a tree in accordance with various embodiments of the invention.

For example, turning now to FIG. 7, a flowchart of illustrative process 700 is shown for updating a tree (e.g., tree 210 of FIG. 2). Process 700 may begin at step 702, and at step 704, an NVM interface (e.g., NVM interface 118 of FIG. 1 or NVM interface 318 of FIG. 3) can receive a request to unmap a LBA.

Continuing to step 706, the NVM interface can consult a bitmap (e.g., bitmap 400, 402, or 404 of FIGS. 4A-4C, respectively) to determine whether the LBA is unmapped. If, at step 708, the NVM interface determines that the LBA is unmapped, process 700 may move to step 710.

In some embodiments, at step 710, the NVM interface can transmit information to a file system (e.g., file system 310 of FIG. 3) indicating that the LBA is already unmapped. Thus, as in step 610 of process 600 (FIG. 6), no NVM accesses are needed to determine that the LBA is unmapped. Process 700 may then end at step 712.

Referring back to step 708, if the NVM interface instead determines that the LBA is not unmapped, process 700 may move to step 714. At step 714, the NVM interface can unmap the LBA in the bitmap.

Continuing to step 716, the NVM interface can update one or more validity counters by consulting a tree. In particular, the NVM interface can consult the tree in order to obtain a logical-to-physical mapping corresponding to the LBA. Thus, for example, the NVM interface can locate an entry of the tree corresponding to the LBA, and using the entry, the NVM interface can determine which super block(s) stores data associated with the LBA. After making this determination, the NVM interface can decrement one or more validity counters that are associated with the super block(s). Consequently, because the tree is also stored in memory, the unmapping process involves only memory accesses.

Then, at step 718, the NVM interface can update the tree to reflect the unmapped LBA only if tree memory usage decreases with the update. That is, the NVM interface can determine to update the tree only if the update can produce a net reduction in the total number of entries of the tree. For example, a tree update may be advantageous if multiple logically contiguous segments of data are being unmapped (e.g., multiple small database entries are being deleted). Consequently, the entries corresponding to these data segments can be flattened (e.g., consolidated), and a smaller tree can be produced, which decreases the overall tree memory usage. A smaller tree may also improve the rate at which tree searches can be performed.

In contrast, if only a small data segment is being unmapped, a tree update may not be performed if it will cause tree mappings to tear (e.g., if the middle or front of a larger tree entry was being unmapped). This tree update may therefore undesirably produce a greater number of entries.

In some embodiments, the NVM interface can update the tree to reflect the unmapped LBA by locating an entry of the tree that corresponds to the LBA. After locating the entry, the NVM interface can update a physical address (e.g., a physical page address or a virtual block address) in the entry associated with the LBA to a pre-determined token value.

In embodiments where the NVM interface is unable to determine the logical-to-physical mapping for a LBA by consulting a tree (e.g., the logical-to-physical mapping is not stored in the tree because the tree memory is nearly exhausted, or the system does not have a tree), the NVM interface may need to determine the logical-to-physical mapping by loading an index page from the NVM into volatile memory. Although this scenario involves accessing the NVM, the NVM access is limited to a read operation. In contrast to program operations, read operations generally do not trigger garbage collection.

Figure 8:
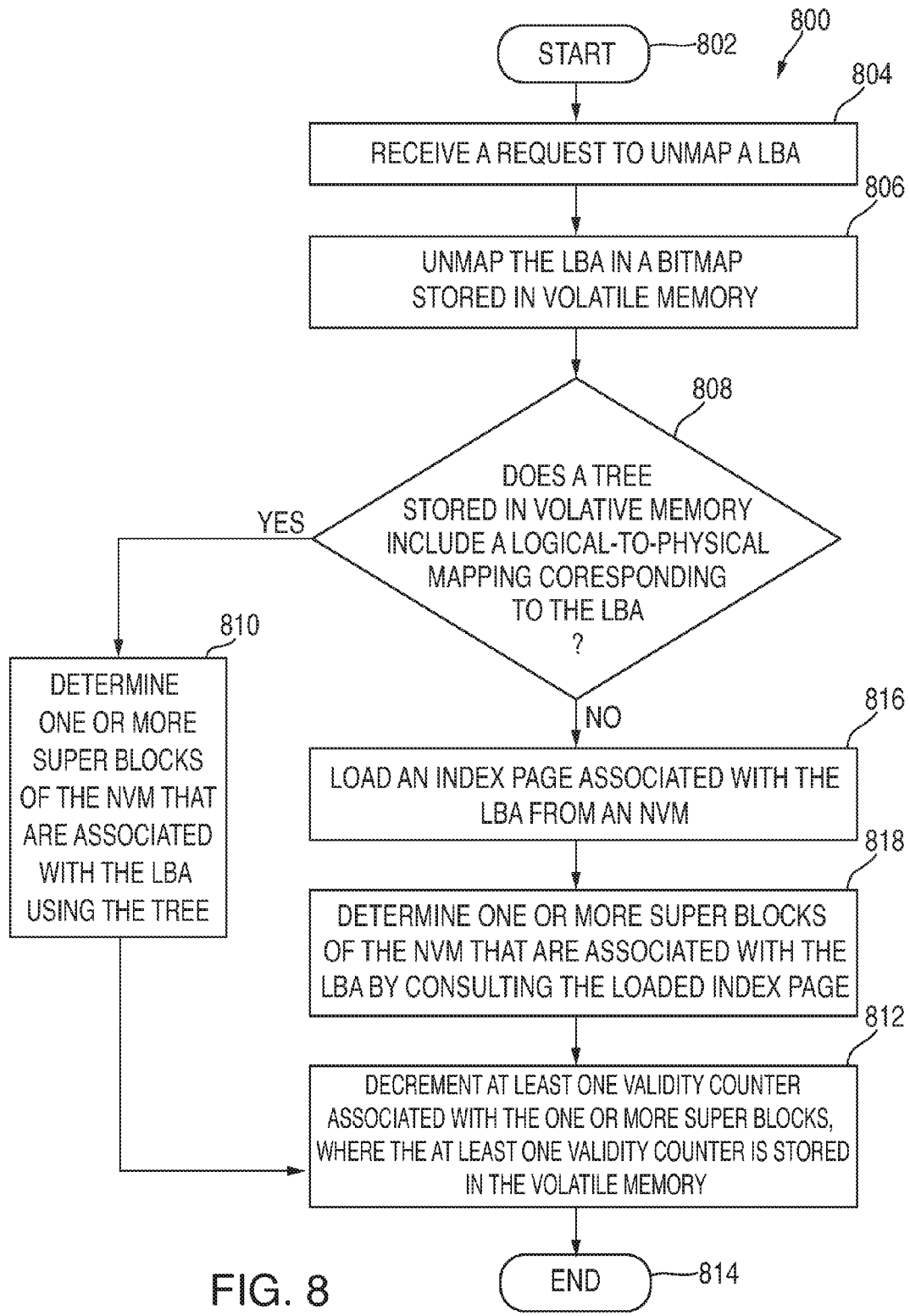
FIG. 8 is a flowchart of an illustrative process for updating validity counters in accordance with various embodiments of the invention.

For example, turning now to FIG. 8, a flowchart of illustrative process 800 is shown for updating validity counters. Process 800 may begin at step 802, and at step 804, an NVM interface (e.g., NVM interface 118 of FIG. 1 or NVM interface 318 of FIG. 3) can receive a request to unmap a LBA.

Continuing to step 806, the NVM interface can unmap the LBA in a bitmap (e.g., bitmap 400, 402, or 404 of FIGS. 4A-4C, respectively) stored in volatile memory (e.g., memory 114 of FIG. 1). Although step 806 may involve additional steps, such as steps 704-714 of process 700 (FIG. 7), these additional steps have been omitted from process 800 for the sake of simplicity.

At step 808, the NVM interface can determine whether a tree (e.g., tree 210 of FIG. 2) stored in volatile memory (e.g., memory 114 of FIG. 1) includes a logical-to-physical mapping corresponding to the LBA. If, at step 808, the NVM interface determines that the tree includes the logical-to-physical mapping corresponding to the LBA, process 800 may move to step 810.

At step 810, the NVM interface can determine one or more super blocks of the NVM that are associated with the LBA using the tree.

Then, at step 812, the NVM interface can decrement at least one validity counter associated with the super block, where the at least one validity counter is stored in the volatile memory. Because the one or more super blocks were determined using the tree, the NVM interface does not have to perform any reads or writes of index pages stored in the NVM. This can help reduce the probability that garbage collection will be triggered. Process 800 may then end at step 814.

Referring back to step 808, if the NVM interface instead determines that the tree does not include the logical-to-physical mapping corresponding to the LBA, process 800 may move to step 816. At step 816, the NVM interface can load an index page (e.g., one of index pages 1-N of FIG. 2) associated with the LBA from an NVM (e.g., NVM 120 of FIG. 1 or NVM 320 of FIG. 3). For example, the NVM interface can load the index page into an index table cache (e.g., index table cache 204 of FIG. 2).

Continuing to step 818, the NVM interface can determine one or more super blocks of the NVM that are associated with the LBA by consulting the loaded index page. Then, at step 812, the NVM interface can decrement at least one validity counter associated with the one or more super blocks. Thus, although the NVM interface needs to read an index page in this scenario, the NVM interface does not have to update and re-program the index page in the NVM. The net result is that the total number of index page accesses can still be reduced, and garbage collection can be avoided. Process 800 may then end at step 814.

In embodiments where logical-to-physical mappings are not (or not fully) maintained in a tree, but rather are maintained in index pages (e.g., index pages 1-N of FIG. 2) stored in an NVM, maintaining a bitmap can also improve a garbage collection process. In particular, using a bitmap, an NVM interface can reduce the number of index page accesses that need to be made during garbage collection.

Figure 9:
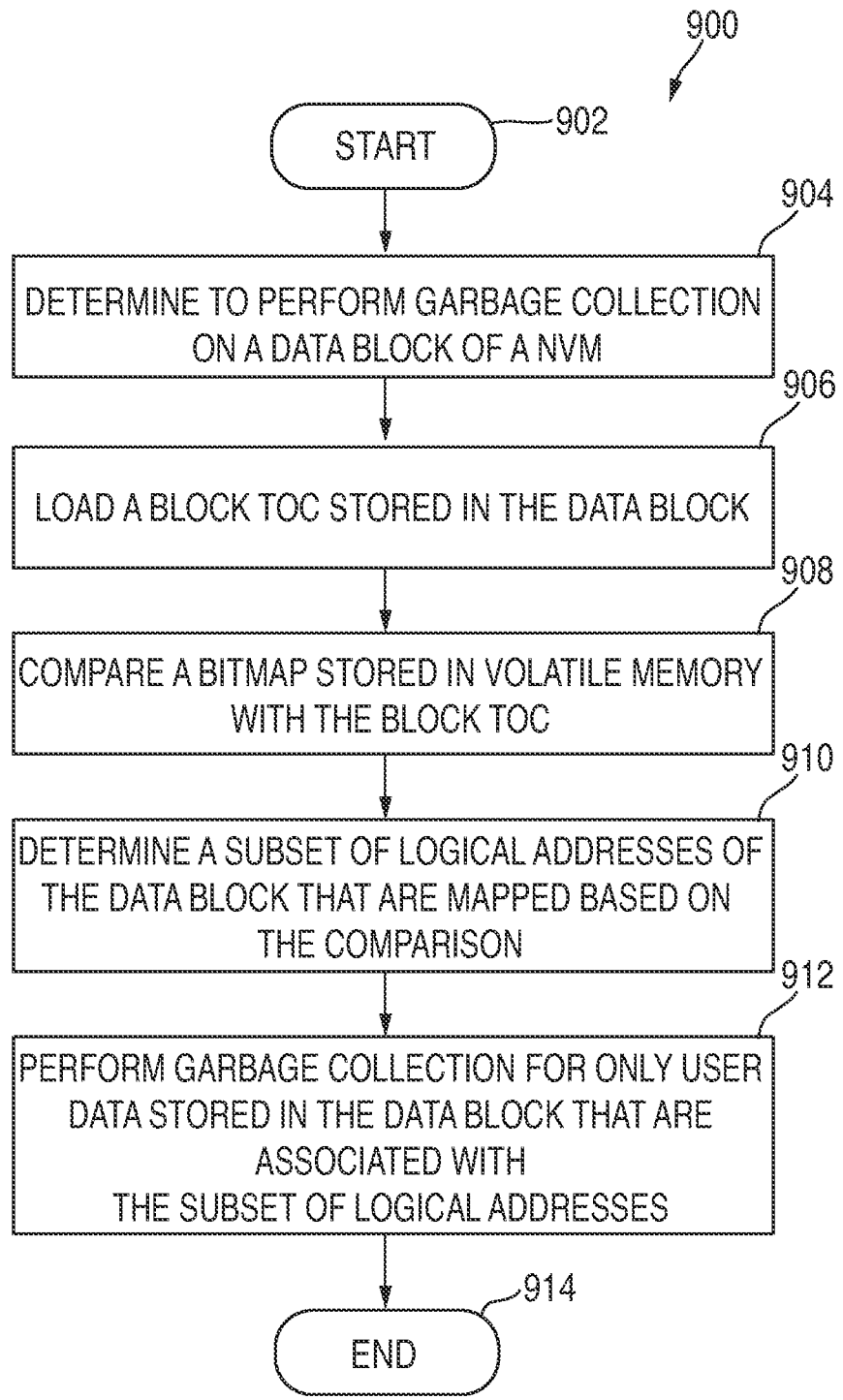
FIG. 9 is a flowchart of an illustrative process for faster garbage collection in accordance with various embodiments of the invention.

For example, turning now to FIG. 9, a flowchart of illustrative process 900 is shown for faster garbage collection. Process 900 may begin at step 902, and at step 904, an NVM interface (e.g., NVM interface 118 of FIG. 1 or NVM interface 318 of FIG. 3) can determine to perform garbage collection on a data block (e.g., one of data blocks 1-N of FIG. 2) of a NVM.

Continuing to step 906, the NVM interface can load a block TOC (e.g., one of block TOCs 1-N of FIG. 2) stored in the data block. Then, at step 908, the NVM interface can compare a bitmap (e.g., bitmap 400, 402, or 404 of FIGS. 4A-4C, respectively) stored in volatile memory with the block TOC.

At step 910, the NVM interface can determine a subset of logical addresses (e.g., LBAs) of the data block that are mapped based on the comparison. For example, using the bitmap, the NVM interface can determine which LBAs are unmapped. These unmapped LBAs can therefore be excluded from the garbage collection process.

Continuing to step 912, the NVM interface can perform garbage collection for only user data stored in the data block that are associated with the subset of logical addresses. Garbage collection can be performed in various ways depending on the system. For example, in embodiments where the system does not maintain a tree, the NVM interface can locate the user data by accessing only index pages stored in the NVM corresponding to the subset of logical addresses. Thus, for each logical address of the subset of logical addresses, the NVM interface can access an index page (e.g., one of index pages 1-N of FIG. 2) associated with the logical address. Then, based on the index page, the NVM interface can determine a physical address of the data block corresponding to the logical address. After determining the physical address, the NVM interface can copy user data from the physical address to a different data block of the NVM.

In embodiments where a tree (e.g., tree 210 of FIG. 2) is stored in volatile memory, the NVM interface can determine if the tree includes logical-to-physical mappings for the subset of logical addresses. For example, for each logical address of the subset of logical addresses, the NVM interface can consult the tree to determine whether a logical-to-physical mapping exists for the logical address. If the NVM interface determines that the logical-to-physical mapping does not exist for the logical address, the NVM interface can access an index page associated with the logical address. Then, as discussed above, based on the index page, the NVM interface can determine a physical address of the data block corresponding to the logical address. After determining the physical address, the NVM interface can copy user data from the physical address to a different data block of the NVM.

However, if the NVM interface determines that the logical-to-physical mapping exists for the logical address, the NVM interface can determine a physical address of the data block corresponding to the logical address using the tree. Then, the NVM interface can copy the user data from the physical address to a different data block of the NVM. After performing garbage collection, process 900 may end at step 914.

Thus, by using a bitmap to reduce the number of logical addresses that need to be examined in the NVM, the number of NVM operations that need to be performed during garbage collection can correspondingly be reduced. As a result, the garbage collection process can be performed more efficiently.

Furthermore, in embodiments where logical-to-physical mappings are fully maintained in a tree stored in volatile memory, maintaining a bitmap can also marginally improve the garbage collection process. By consulting the tree for only a subset of logical addresses, the amount of memory accesses can be reduced.

It should be understood that processes 500, 600, 700, 800, and 900 of FIGS. 5-9 may be executed by one or more components in a system (e.g., electronic device 100 of FIG. 1 or electronic device 300 of FIG. 3). For example, at least some of the steps in the processes may be performed by a NVM interface (e.g., NVM interface 118 of FIG. 1 or NVM interface 318 of FIG. 3). Persons skilled in the art will appreciate that one or more of the steps may be performed by a control circuitry (e.g., SoC control circuitry 112 of FIG. 1).

Furthermore, it should be understood that processes 500, 600, 700, 800, and 900 of FIGS. 5-9 are merely illustrative. Any of the steps may be removed, modified, or combined, and any additional steps may be added, without departing from the scope of the invention.

The described embodiments of the invention are presented for the purpose of illustration and not of limitation.

What is claimed is:

1. A method for faster data garbage collection ("GC"), the method comprising:
   determining to perform garbage collection on a data block of a non-volatile memory ("NVM");
   loading a block table-of-contents ("TOC") stored in the data block;
   comparing a bitmap stored in volatile memory with the block TOC;
   determining a subset of logical addresses of the data block that are mapped based on the comparison;
   performing garbage collection for only user data stored in the data block that are associated with the subset of logical addresses;
   for each logical address of the subset of logical addresses, consulting a tree stored in volatile memory to determine whether a logical-to-physical mapping exists for the logical address;
   in response to determining that the logical-to-physical mapping does not exist for the logical address, accessing an index page associated with the logical address;
   determining a physical address of the data block corresponding to the logical address based on the index page; and
   copying user data from the physical address to a different data block of the NVM.

2. The method of claim 1, wherein the bitmap stores mapping statuses for a plurality of logical block addresses ("LBAs").

3. The method of claim 1, further comprising locating the user data by accessing only index pages stored in the NVM corresponding to the subset of logical addresses.

4. The method of claim 3, further comprising:
   for each logical address of the subset of logical addresses, accessing an index page associated with the logical address;
   determining a physical address of the data block corresponding to the logical address based on the index page; and
   copying user data from the physical address to a different data block, of the NVM.

5. The method of claim 1, further comprising:
   in response to determining that the logical-to-physical mapping exists for the logical address, determining the physical address of the data block corresponding to the logical address using the tree; and
   copying the user data from the physical address to the different data block of the NVM.

6. A system for faster data garbage collection ("GC"), the system comprising:
   multi-state non-volatile memory ("NVM");
   control circuitry coupled to the NVM and operative to:
   determine to perform garbage collection on a data block of a non-volatile memory ("NVM");

load a block table-of-contents ("TOC") stored in the data block;
compare a bitmap stored in volatile memory with the block TOC;
determine a subset of logical addresses of the data block that are mapped based on the comparison;
perform garbage collection for only user data stored in the data block that are associated with the subset of logical addresses;
consult a tree stored in volatile memory to determine whether a logical-to-physical mapping exists for the logical address for each logical address of the subset of logical addresses;
in response to determining that the logical-to-physical mapping does not exist for the logical address, access an index page associated with the logical address;
determine a physical address of the data block corresponding to the logical address based on the index page; and
copy user data from the physical address to a different data block of the NVM.

7. The system of claim 6, wherein the bitmap stores mapping statuses for a plurality of logical block addresses ("LBAs").

8. The system of claim 6, wherein the control circuitry is operative to locate the user data by accessing only index pages stored in the NVM corresponding to the subset of logical addresses.

9. The system of claim 8, wherein the control circuitry is operative to:
access an index page associated with the logical address for each logical address of the subset of logical addresses;
determine a physical address of the data block corresponding to the logical address based on the index page; and
copy user data from the physical address to a different data block of the NVM.

10. The system of claim 6, wherein the controller is operative to:
in response to determining that the logical-to-physical mapping exists for the logical address, determine the physical address of the data block corresponding to the logical address using the tree; and
copy the user data from the physical address to the different data block of the NVM.

* * * * *